Oct. 27, 1936.    E. S. SMITH, JR    2,059,151
TELEMETRIC PROPORTIONING SYSTEM
Filed June 2, 1934
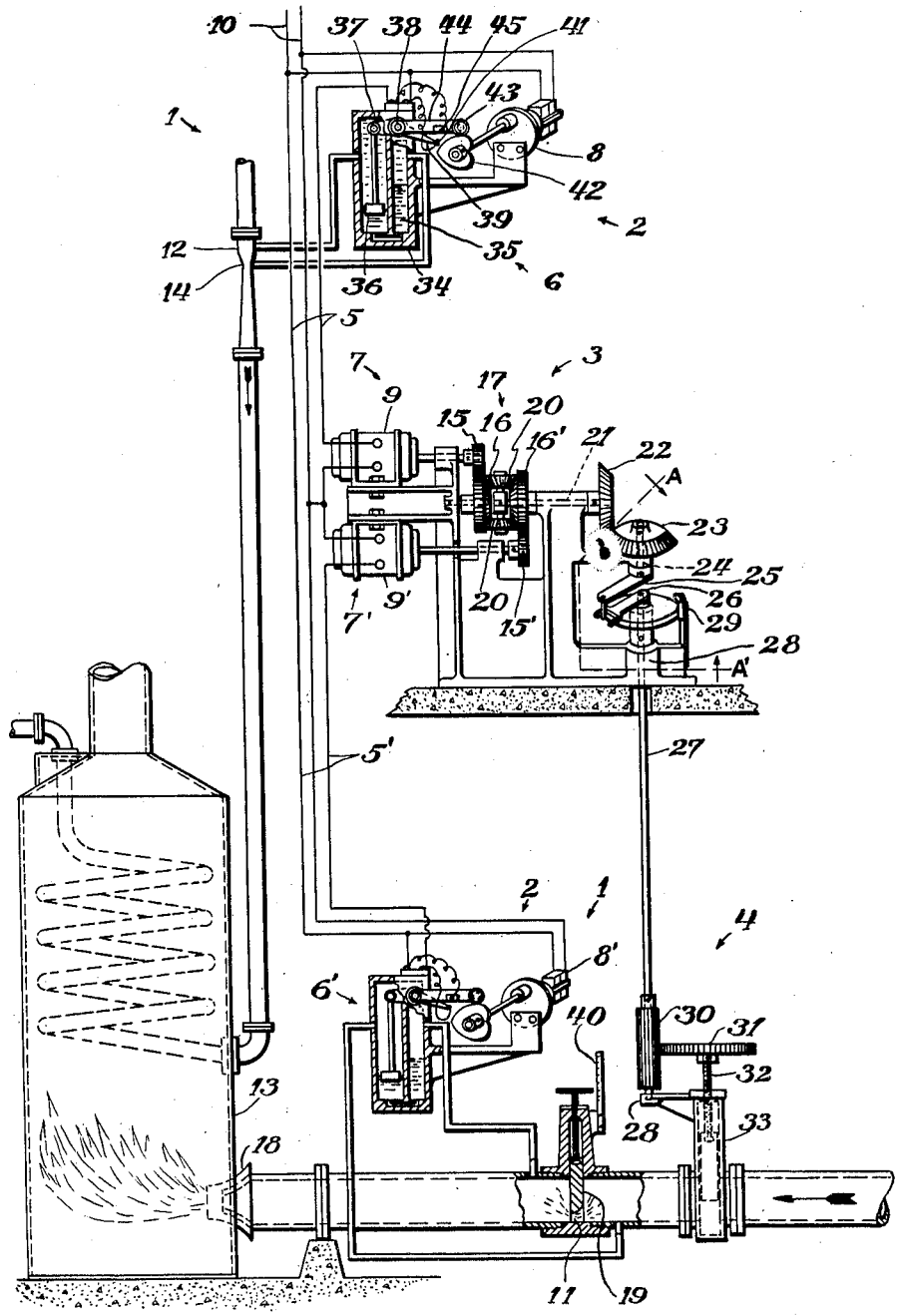
INVENTOR
*Ed S. Smith Jr.*
BY *Maxwell Barus*
ATTORNEY Patented Oct. 27, 1936

2,059,151

UNITED STATES PATENT OFFICE 2,059,151

TELEMETRIC PROPORTIONING SYSTEM

Ed S. Smith, Jr., Providence, R. I., assignor to Builders Iron Foundry, Providence, R. I., a corporation of Rhode Island Application June 2, 1934, Serial No. 728,730

13 Claims. (Cl. 137—164)

My invention relates to improvements in proportioning controllers where one quantity is telemetrically controlled in correspondence to another quantity. My invention is particularly applicable where both quantities are fluid quantities, or where the master quantity is a fluid flowing in a conduit and the dependent quantity is another substance, whether a dry solid, a liquid, a vapor or a gas.

Another object of my invention is to provide means for telemetrically governing the proportioning in a predetermined ratio with high accuracy by means of signals that are a function of time, so that the master and dependent quantities need not be near each other—a requirement that, in practice, often eliminates other types of proportioning controllers.

A further feature of my invention is to provide such a telemetrically operated controller with integrator-type receivers for maintaining the average of the dependent quantity in a predetermined proportion to that of the master quantity.

Another object of my invention is to displace a member in each of such integrator-type telemetric receivers through extents proportional to the time durations cyclically signalled to such receivers.

A further specific object of my invention is to telemeter by means of a function of time, the rate of flow of the master quantity and, at a receiver, position a portion thereof to control the feeding of another quantity at a rate dependent upon said telemetered master rate.

A further specific object of my invention is to provide a telemeter for at least one of said quantities with adjustable means for altering the relation between said quantity and its respective signal response. In my preferred embodiment I provide an adjustable orifice for the dependent quantity manually settable to thus alter the predetermined proportion between the master and dependent quantities.

The drawing shows a diagrammatic elevation, partially in section and partially in perspective, of one embodiment of my invention.

In the drawing like characters of reference indicate like parts throughout, primes being generally used for the dependent quantity means to distinguish them from the master means: 1 means responsive to a quantity, 2 means for telemetering said quantity by means of a function of time, 3 governing means actuatable by said telemetric means to control the dependent quantity by control means 4 broadly shown, telemetric circuit means 5, transmitter means 6 actuated by said quantity responsive means 1 to produce signalling impulses in said circuit means 5 of a time duration corresponding to the rate of the master quantity, 7 broadly telemetric receiver means cyclically responsive to said signal durations and hence corresponding to the quantity. Substantially synchronous motors 8 and 9 respectively of transmitter 6 and receiver 7 are preferably attached to a common A. C. supply 10 having the same frequency at both transmitter and receiver means to give the utmost accuracy of telemetering.

The governing means 3 broadly consists of means operatively connecting the telemetric receiver means 7 responsive to the master quantity with similar means 7' responsive to the dependent quantity. The telemetric receiver means 7 may either comprise integrator-type means, or well-known braked indicator-type means as in U. S. Patent Re. 19,039 to Wilde without departing from my invention. As shown in the drawing, I provide quantity responsive means 1 consisting of a Venturi tube 12 for the master quantity, in this case oil being fed to a pipe still 13. This Venturi tube has a fixed throat orifice 14, i. e. opening. Telemetric transmitter 6 is attachable to the Venturi tube 12 and is connected to circuit 5 as described in copending applications of David J. Purdie, S. N. 728,661 and of Charles G. Richardson, S. N. 728,655, both filed June 2, 1934 and assigned to the same assignee. Integrator-type receiver 7 has a motor 9 connected to telemetric circuit 5 to operate a spur gear 15 driving one-half 16 of the differential gear system 17. The burner 18 for still 13 is provided with fuel gas, through an adjustable orifice 19 having a similar transmitter 6' attached thereto and connected to telemetric circuit 5' that, as before, has integrator-type receiver 7' connected thereto. This receiver 7' has a motor 9' operating the spur gear 15' driving the other half 16' of the differential gear system 17. The idler bevel gears 20 for this system 17 are mounted in the usual manner on shaft 21 that turns when the two halves 16 and 16' of the differential gear system 17 move unequally. Attached to this shaft 21 is bevel gear 22 driving another bevel gear 23, shown in perspective as are other parts within the dot-dash line A—A'. This bevel gear 23 is attached to a shaft 24, to which is also attached a crank arm 25 cooperating with a "lost-motion" yoke 26 on another shaft 27 coaxial with the crank arm shaft 24. This shaft 27 is free to rotate in bearings 28, is braked by brake 29 and has a pinion gear 30 attached to its other end. This gear 30 drives a larger spur gear 31 attached to the screw 32 on the gate valve 33, in a well-known manner.

The oil Venturi tube 12, with throat 14, has connected with it transmitter 6 consisting of a U-tube 34 containing mercury 35 and having a float 36 positioned by the surface of the mercury in one leg of U-tube. This float is connected with arm 37 attached to a shaft 38 having another arm 39 mounted outside of said U-tube 34, said shaft 38 passing through a stuffing box. Contact 41 is carried by the outer arm 39. Cam 42 is mounted on motor 8 to raise and lower cam roller 43 rotatably mounted on the outer end of a third arm 44 carrying contact 45 and being pivotally mounted on shaft 38. Contacts 41 and 45 coact to complete circuit 5 to which they are attached. Similarly, the gas adjustable orifice 19 has transmitter 6' attached thereto.

The operation of this embodiment of my invention is as follows:

Oil flows through Venturi tube 12 and produces a pressure differential that in turn displaces the mercury 35 and hence float 36 in U-tube 34 thus positioning the contact arm 39. The constantly rotating cam 42 raises and lowers the upper contact arm 44 by means of the roller 43 attached to its outer end so that the weight of arm 44 causes the upper contact 45 to rest on the lower contact 41 for a period of time that depends on the rate of flow of oil through Venturi tube 12 on its way to still 13. This completes the telemetric circuit 5 and causes a continuous signalling current to flow for the time duration that these contacts 41 and 45 coact. At receiver 7 motor 9 is operated by the signaling current in circuit 5 for the duration of the impulse.

The gas for still 13 passes through adjustable orifice 19 to create a pressure differential corresponding with the flow rate of the gas. This pressure differential operates transmitter 6' in a similar manner to that described for transmitter 6 for the oil. Transmitter 6' thus cyclically creates continuous signaling impulses in circuit 5' and at receiver 7' similarly operates a motor 9' for an extent in each cycle corresponding to the gas flow rate. Obviously a change of the effective area of the adjustable orifice opening 11 alters this relation and so alters the predetermined relation between the gas and oil quantity rates.

The quantity rates of oil and fuel gas fed to the still 13 and burner 18 cause the integrator-type telemetric receivers 7 and 7' to rotate their respective halves 16 and 16' of their differential gear system 17. Where these do not operate equally, the differential idler gears 20 will move the shaft 21 to operate the bevel gears 22 and 23 and the crank arm 25 and its lost-motion yoke 26 braked by brake 29, partially shown in perspective in A—A', and so actuate valve 33 controlling the supply of fuel gas to burner 18 to bring the proportion of fuel gas to heated oil to that predetermined by the setting of the adjustable orifice 19 as shown on scale 40 attached thereto. It should be apparent that this system of control maintains a constant heat input for a unit volume of oil and so produces a distillation product of substantially constant characteristics. It is also obvious that a change of the effective area of opening 11 of adjustable orifice 19 may be made as described to alter the ratio of gas to oil as shown on scale 40 and consequently alter the character of the distillation product as above described.

The lost-motion means has a freely oscillable crank arm 25 and braked yoke 26 limiting the free motion of crank arm 25. This braked yoke 26 normally gives a steady position to the controlling valve 33 so that the rate of dependent fluid is steadily proportional to that of the master quantity in spite of the fact that a cyclical method of intermittent telemetering has been used. Consequently this controller is adapted to normally maintain a substantially steady flow of dependent fluid regardless of the cyclical frequency of transmission. This is an improvement over other systems that require a fairly high frequency of cyclical transmission to maintain even an approximately uniform flow of the dependent fluid.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a system for maintaining a predetermined ratio between two quantities cyclically telemetered by signals of durations corresponding therewith, the combination of telemetric receiver means for each quantity each having a portion responsive to its respective signal duration, said receiver means including differential means cyclically responsive to the difference between said receiver means signal responses, and means for controlling one of said quantities actuatable by said receiving differential means.

2. In a telemetric proportioning system, the combination of means for cyclically telemetering two quantities by signals having durations corresponding therewith comprising two receiver means each adapted to move in each cycle an extent corresponding with its said respective signal duration, and means cyclically governed by said receiver movable means for controlling one of said quantities to maintain the average extent or displacement of one of said movable means substantially in a predetermined proportion to that of the other.

3. In a telemetric proportioning system, the combination of means for cyclically telemetering master and dependent quantities by signals having durations corresponding therewith including a receiver means for each quantity having a portion cyclically movable corresponding with its respective signal duration, and proportioning means actuatable by said receiver means movable portions for controlling said dependent quantity in a predetermined relation to said master quantity.

4. In a telemetric proportioning system, the combination of means for cyclically telemetering master and dependent quantities by signals having durations corresponding therewith, including receiver means each having a portion cyclically movable through extents proportional to its respective signal durations; and means, including lost-motion means, actuatable by said movable portions for controlling said dependent quantity.

5. In a telemetric proportioning system as set forth in claim 4, said controlling means affected by said lost-motion means being adapted to remain in its last-set position as long as said telemetered master and dependent quantities remain in a predetermined relation.

6. In a telemetric proportioning system for a master and a dependent quantity, the combination of two receiver means, each having a portion cyclically movable an extent corresponding with its respective said quantity; differential means connecting said receiver movable portions and having a part movable a net extent in each cycle corresponding with the difference of said extents of said receiver movable portions; lost-motion means comprising a member normally freely movable by said differential means net movable part to normally oscillate cyclically within limits, and a braked member coactable therewith and adapted to remain in its last-set position until said freely movable member moves beyond its said limits of free oscillation to then reposition said braked member; and controlling means for said dependent quantity positionable by said lost-motion means braked member.

7. In a telemetric proportioning system as set forth in claim 6, each of said transmitter means being adapted to cyclically create in its respective circuit continuous signalling impulses corresponding in duration with its said quantity, and each receiver means having a portion cyclically movable an extent proportional to its said signalling impulse duration.

8. In a system for controlling the flow rate of a dependent fluid quantity in a predetermined proportion to that of a master fluid quantity, the combination of telemetering means for said quantities comprising operatively connected transmitter, receiver and circuit means; said transmitter means for one quantity comprising fixed orifice means coacting with its said fluid to produce a pressure differential corresponding with its said flow, and signalling means responsive to said pressure differential; said other quantity transmitter means comprising adjustable orifice means coacting with its respective said fluid to produce a pressure differential corresponding with its said flow, and signalling means responsive to said pressure differential; each of said signalling means being connected to its respective circuit means and adapted to cyclically create a continuous signalling current impulse therein corresponding in duration with its said quantity flow rate; each of said receiver means being connected to its said circuit and comprising a motor having a shaft operable at substantially constant speed by its said signalling current impulse for the duration thereof to thus rotate said shaft in each cycle an amount corresponding therewith; differential gear means having oppositely rotatable gears, each connected to its said receiver motor shaft and a gear-carrying portion positionable by the difference of said oppositely rotatable gears rotation amounts; a lost-motion means having a member freely and cyclically oscillatable within limits by said differential positionable portion and a braked member coactable therewith when said oscillatable member moves beyond its said limits; and valve means displaceable by said braked member an amount corresponding with said difference of said receiver shaft rotation amounts to control said dependent fluid quantity rate.

9. In a telemetric proportioning system, the combination, of means for cyclically telemetering two quantities each including receiver means having a portion responsive in a predetermined relation to its respective quantity, means connected to said telemetering means and adjustable to alter said relation, and means connecting said receiver quantity cyclically responsive portions and adapted to respond to the difference of the responses of said receiver means movable portions.

10. In a telemetric proportioning system, the combination of means for cyclically telemetering the rates of delivery of two substances, each said means including an integrator-type receiver having a portion movable at an average rate corresponding in a predetermined relation with said delivery rate, means connected to said telemetering means and adjustable to alter said relation, and means connecting said receiver movable portions and adapted to respond to the difference of the responses of said receiver means movable portions.

11. In a telemetric proportioning system, the combination of means for cyclically telemetering two quantities by signals of a function of time corresponding therewith, each including an integrator-type receiver having a portion movable at an average rate corresponding in a predetermined relation with said quantity, and means connecting said receiver quantity responsive portions and adapted to respond to the difference of the responses of said receiver means movable portions.

12. In a telemetric proportioning system, the combination of means for cyclically telemetering two quantities by signalling impulses corresponding in duration therewith each including receiver means having a portion movable in each cycle an extent from its initial position corresponding with its respective signal duration and hence in a predetermined relation with its respective quantity, means connected to at least one of said telemetering means to alter said relation, and means connecting said receiver means movable portions and adapted to respond to the difference of said extents of movements thereof.

13. In a telemetric proportioning system, the combination of means for cyclically telemetering two quantities by signalling impulses corresponding in duration therewith each including receiver means having a portion movable in each cycle an extent from its initial position corresponding with its respective signal duration and hence in a predetermined relation with its respective quantity, and means connecting said receiver means movable portions and adapted to respond to the difference of said extents of movements thereof.

ED S. SMITH, JR.

DISCLAIMER 2,059,151.—*Ed S. Smith, Jr.*, Providence, R. I. TELEMETRIC PROPORTIONING SYSTEM. Patent dated October 27, 1936. Disclaimer filed January 30, 1941, by the assignee, *Builders Iron Foundry*.

Hereby disclaims from the scope of claim 1 of said Letters Patent any system or combination except one wherein the quantity controlled is a variable physical condition inherently subject to change with time, the value of which condition is regulated through signals corresponding with values of an independent master variable, and wherein a departure of said condition from a given value of said master variable is opposed by means controlled by said signals for maintaining said condition substantially at said given value.

[*Official Gazette March 4, 1941.*]